US006393157B1

(12) United States Patent
Miller

(10) Patent No.: US 6,393,157 B1
(45) Date of Patent: May 21, 2002

(54) METHOD FOR AUTOMATICALLY DETECTING OBJECTS OF PREDEFINED SIZE WITHIN AN IMAGE

(75) Inventor: Lance Miller, Oxford (GB)

(73) Assignee: Particle Physics and Astronomy Council, Wiltshire (GB)

(*) Notice: Subject to any disclaimer, the term of this patent is extended or adjusted under 35 U.S.C. 154(b) by 0 days.

(21) Appl. No.: 09/202,060
(22) PCT Filed: Jun. 3, 1997
(86) PCT No.: PCT/EP97/02963
§ 371 Date: Jul. 14, 1999
§ 102(e) Date: Jul. 14, 1999
(87) PCT Pub. No.: WO97/46971
PCT Pub. Date: Dec. 11, 1997

(51) Int. Cl.[7] .................................................. G06K 9/36
(52) U.S. Cl. ........................................ 382/254; 382/260
(58) Field of Search ......................... 382/254, 260–269, 382/276–280

(56) References Cited

U.S. PATENT DOCUMENTS

| | | | |
|---|---|---|---|
| 4,907,156 A | 3/1990 | Doi et al. ................... 364/413 |
| 4,941,733 A | * 7/1990 | Leib ....................... 350/162.13 |
| 5,164,730 A | 11/1992 | Jain ............................. 342/25 |
| 6,070,093 A | * 5/2000 | Oosta et al. ................. 600/316 |

* cited by examiner

Primary Examiner—Thomas D. Lee
Assistant Examiner—Stephen Brinich
(74) Attorney, Agent, or Firm—Hoffman, Warnick & D'Alessandro LLC; John A. Merecki

(57) ABSTRACT

The digital representation of the image is sequentially subjected to the following steps: (i) applying the Fourier transform to the original image; (ii) defining a critical Fourier wavelength equal to the predefined size of the objects; (iii) applying one of the techniques of entropy maximization or cross-entropy minimization to the original image to create the new image wherein (a) the amplitudes and the phases of the Fourier components of the new image with wavelengths that are shorter than the critical Fourier wavelength are substantially the same as the amplitudes and the phases of the Fourier components of the original image, and wherein (b) for the amplitudes and the phases of Fourier components having wavelengths that are longer than the critical wavelength, new values are estimated so that either image cross-entropy is minimized or image entropy is maximized.

13 Claims, 1 Drawing Sheet

METHOD FOR AUTOMATICALLY DETECTING OBJECTS OF PREDEFINED SIZE WITHIN AN IMAGE

DESCRIPTION

1. Field of the Invention.

The invention is in the field of image processing performed on digital images, more particular on medical images such as mammographic images.

More particularly the invention relates to the automatic detection of objects or structures which have physical significance within a complex or cluttered digital image, such as a digitised medical image (e.g. a digital mammogram used for detecting breast cancer, or else a film-based mammogram which has been digitised so as to be suitable for analysis). In the case of mammography, the objects to be detected are radiological opacities which might be considered by radiologists to be suspiciously abnormal. More generally, the objects could be any suspicious radiological opacity (e.g. in chest X-rays) or could be a discrete feature in any other form of digital imaging (e.g. an object of interest in a sonar scan).

As indicated above, the invention has a wide range of potential application. The invention has been made within the specific context of breast imaging, and in particular as part of an attempt to construct a system which can automatically detect suspicious features within a breast image and alert a radiologist to the presence of those features. Radiologists are interested in a number of different abnormal features: this invention relates to the detection specifically of radiological opacities, which can include radiological categories such as ill-defined masses and stellate or spiculated masses or lesions.

Such an invention functions by obtaining a representation of a scene or image which can be manipulated and transformed by a computer system. The invention thus comprises an image acquisition part, a computation part, and an output part which either presents results of the computer manipulation or passes those results onto a further computer system for further analysis. The methods applied within the computer subsystem are particularly critical to the success of the overall system.

The following description relates to the computer's manipulations.

2. Description of the Prior Art

For the purposes of this description we shall define an image to be a representation of a physical scene, in which the image has been generated by some imaging technology: examples of imaging technology could include television or CCD cameras or X-ray, sonar or ultrasound imaging devices. The initial medium on which an image is recorded could be an electronic solid-state device, a photographic film, or some other device such as a photostimulable phosphor. That recorded image could then be converted into digital form by a combination of electronic (as in the case of a CCD signal) or mechanical/optical means (as in the case of digitising a photographic film or digitising the data from a photostimulable phosphor). The number of dimensions which an image could have could be one (e.g. acoustic signals), two (e.g. X-ray radiological images) or more (e.g. nuclear magnetic resonance images).

The general problem to be tackled is to analyse such an image so as to identify, or help identify, the brightness fluctuations in the image which result from the presence of discrete physical structures within the original scene. This is relatively easy in cases where an image comprises only a uniform background brightness with a single localised fluctuation in brightness caused by an object, or where an image contains brightness fluctuations due to more than one discrete object but which are widely separated on the image. The aim of this invention is to help analyse more complex images, where the brightness fluctuations due to the object of interest are superimposed on a background of variable brightness, or where a number of objects are either physically close together or even overlapping. The latter problem is particularly acute in images which are two-dimensional projections of a three-dimensional scene, such as radiological images, and we shall tend to refer to the latter in the subsequent discussion. We shall refer to this type of image as being "cluttered".

A typical example of a cluttered image, and one for which this invention was specifically targeted, is mammographic images, in which the normal structure within a breast creates a complex background of structures, which have highly variable X-ray opacity, size and shape and which frequently overlap and intersect.

A powerful approach to helping to separate out these various structures has become known as multiresolution or multiscale analysis. The aim is to segregate structures in an image into ranges of sizes. In that way, structures in the size-range of interest can be enhanced or individually identified. This is an active research field, and a number of techniques have been proposed and used for carrying out multiscale analysis.

Multiresolution Analysis and Multiresolution Pyramids

The principle usually applied to multiresolution analysis is to smooth, or convolve, an image with a chosen function. If the smoothing function is a low-pass filter, this has the effect of supressing or eliminating high-frequency Fourier components. A set of multiresolution images can be constructed by smoothing the image with a succession of such functions, whose size increases by some factor (usually a factor 2) between each step. The differences between successive steps, or resolution levels, contain information on structures whose size are approximately in the range between the sizes of the filters that were used to generate the difference image. In general, we should expect that lower-resolution data can be represented by a coarser rate of sampling, in which case we would have constructed a multiresolution pyramid (e.a. Burt P J & Adelson E H. 1983. IEEE Transactions on Communications. 31, 532–540).

Wavelet Analysis

An improved approach to generating a multiresolution analysis or pyramid has become known as wavelet analysis (Mallat S G. 1989a. IEEE Transactions on Pattern Analysis and Machine Intelligence. 11, 674–693 & Mallat SG. 1989b, Transactions of the American Mathematical Society, 315. 6–87, Daubechies I., 1992. "Ten Lectures on Wavelets", CBMS-NSF Regional Conference Series in Applied Mathematics. Society for Industrial & Applied Mathematics, Philadelphia, Pa. Chui C K, 1992 (ed). "Wavelet Analysis and its Applications", Vol. I & II, Academic Press), in which the smoothing functions that link each resolution level are carefully chosen to achieve optimum results for the application. If the smoothing function is chosen so that it obeys a scaling law.

$$\phi(x) = 2\sum_n h_n \phi(2x - n)$$

then a multiresolution pyramid may be constructed such that no information is lost in constructing the pyramid. The difference images between successive resolution levels may themselves be encoded as a set of sample points to be convolved with a set of basis functions which are translates of a function known as the wavelet. The total number of sample points in the resulting pyramid may be no more than the number of sample points in the original image—a useful feature where data volume may he a consideration—and the process may be inverted, starting with the multiresolution pyramid to reconstruct exactly the original data.

Having produced the wavelet coefficients for an image, they may then be used to create a lossy compressed image in data-compression applications, or to analyse the structures in an image by measuring the amplitude of the wavelet coefficients at resolution levels of particular interest.

Examples in mammography include the detection of microcalcifications (e.g. Clarke L P. Kallergi M, Qian W. Li H-D, Clark R A & Silbiger M L. 1994. Cancer Letters. 77, 173–181—Laine A F Schuler S. Fan J & Huda, 1994. IEEE Translation on Medical Imaging, 13, 725–740) or in providing a method of texture analysis which forms part of a method for detecting abnormal masses (e.g. Wei D. Chan H-P Helvie M A, Sahiner B. Petrick N. Adler D D & Goodsitt M M, 1995. Medical Physics. 22, 1501–1513).

Disadvantages of Wavelet Analysis

The previous approach using wavelets is not perfect, partly because the wavelet analysis does not perfectly segregate objects of different sizes. It is not usually possible to choose bases of wavelets and scaling functions which are both orthonormal and whose scaling function is an accurate representation of the structure of real objects in an image: this is because orthonormal basis functions must have negative components, which is often unphysical, and they cannot be symmetric and have compact support (e.g. Daubechies I., 1992, "Ten Lectures on Wavelets", CBMS-NSF Regional Conference Series in Applied Mathematics, Society for Industrial & Applied Mathematics, Philadelphia, Pa.). If the objects in an image to be analysed have arbitrary intensity profiles and arbitrary two-dimensional shapes it is not possible to choose basis functions that will create wavelet coefficients only at the resolution level of interest. More appropriate scaling functions can be chosen (e.g. B-spline scaling functions) if the orthonormality constraint is relaxed into a biorthogonality constraint, but even then the scaling functions will not match closely real physical objects. Furthermore, a low-resolution level in the multiresolution pyramid cannot contain the information on the high-resolution positioning of an object, and hence small-scale wavelet coefficients are needed to encode that information.

Even more critically, when using wavelet analysis to analyze the scale-size structure of images, since the wavelets coefficients are generated by a high-pass filter, the summed signal in wavelet coefficients generated by any one object at any one level is always zero: thus although wavelets can be used to locally enhance a region containing an object of a particular size, they cannot be used to completely remove that object from the image without using the wavelet coefficients covering all resolution levels. The wavelet (and its dual in the case of biorthogoanl analysis) are missing the vital low-frequency components which are necessary to achieve correct scale-size segregation of objects: wavelet analysis cannot create a representation of an individual object as it would appear had it been viewed in isolation, rather than in the complex image it actually occurred within.

Median and Morohological Filtering

Other means of analysing the scale-size information have been proposed using filters which are spatially non-linear. These include median and rank-order filters (e.g. Clarke L P, Kallergi M, Qian W. Li H-D, Clark R A & Silbiger M L. 1994. Cancer Letters, 77, 173–181) and mathematical morphology (e.g. Serra J. "Image Analysis by Mathematical Morphology", Academic Press, 1982). In one dimension such filters can be constructed which have some useful properties, but again the complete reconstruction of objects using a restricted portion of a scale-size anaylysis is not possible, and in two or more dimensions even the edge-preserving properties which make median filtering attractive are lost.

The problem with all the above analyses is that none of them attempt to estimate the amplitude and phase of the low-frequency Fourier components which are associated with an object. To do so is an inverse problem which does not have an unique solution, and the aim of the new work is to find an optimum method of estimating the amplitudes and phases of the Fourier components so that a complete reconstruction of individual objects may be made.

OBJECTS OF THE INVENTION

It is an object of the present invention to provide a method of detecting automatically objects or structures which have physical significance within a complex or cluttered digital image.

It is a further object to provide such a method that is particularly suitable for the automatic detection of such objects or structures in a digitised medical image. e.g. a digital mammogram.

A particular object of this invention is to find an optimum method of estimating the amplitudes and phases of the Fourier components associated with an object so that a complete reconstruction of individual objects may be made.

Still further objects will become apparent from the description hereafter.

STATEMENT OF THE INVENTION

Figure 1:
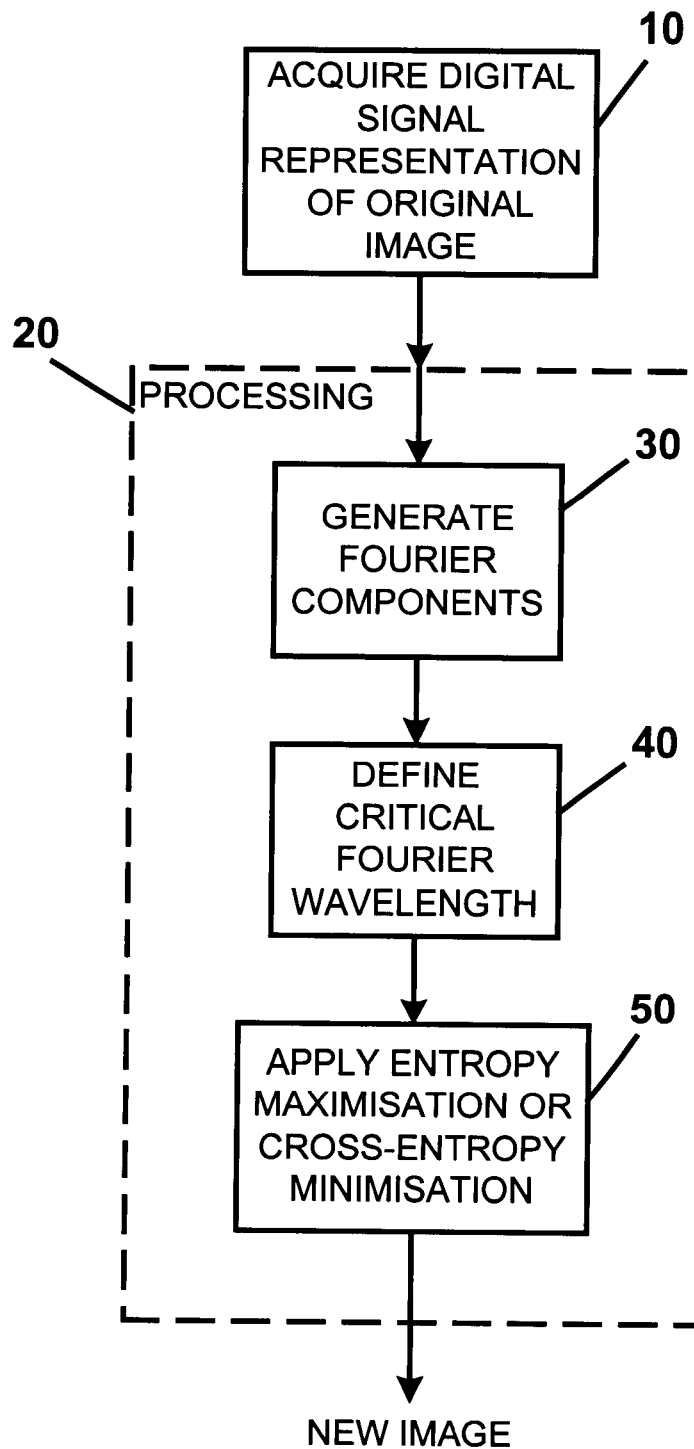
FIG. 1 is a flowchart illustrating the method of the present invention.

As detailed in the flowchart illustrated in FIG. 1, the above objects are achieved by a method for automatically detecting objects within an original image, said objects having a size which is smaller than a predefined maximum size comprising the steps of:

acquiring (step 10) a digital signal representation of said original image, applying (step 20) said digital signal representation to a computer to subject it to a process which results in a new image which contains only reconstructions of said objects, said process comprising the steps of:

(i) generating (step 30) Fourier components of said original image by applying the Fourier transform;

(ii) defining (step 40) a critical Fourier wavelength equal to said maximum size; and (iii) applying (step 50) one of the techniques of entropy maximisation or cross-entropy minimisation to said original image to create said new image wherein (a) the amplitudes and the phases of the Fourier components of said new image with wavelengths that are shorter than said critical Fourier wavelength are substantially the same as the amplitudes and the phases of the Fourier components of said original image, and wherein (b) for the amplitudes and the phases of Fourier components having wavelengths that are longer than said critical wavelength, new values are estimated so that either image cross-entropy is minimised or image entropy is maximised.

Although the low frequency Fourier components associated with an object are treated as unknown in the analysis, the constraint is imposed that the new image that is generated must be everywhere positive and also must be everywhere lower in intensity than the original image. Analysis is hereby improved.

A second new image may be created from the difference between the original image and the new image containing objects smaller than the specific size one is focussing at. The second new image then contains objects whose sizes are larger than the size focussed at.

The method according to claim 1 produces first an image containing small objects, while the method of claim 2 generates an image containing the remaining large objects. The constraint of claim 1 is also applied to the large object image in order to improve analysis.

The representations of the individual objects in these images are good approximations to what the objects would have looked like had they been viewed in isolation rather than in a cluttered image.

Besides being applied to the original image, the above method can also be applied to the images that are created by the method of the invention (so to the new images) with a different size being selected.

In this way a set of images is created each of which contains objects of different sizes. Such a set of images can be used to create a multiresolution or multiscale pyramid of images.

As has been described above, this invention deals with the problem of how to estimate the amplitude and phase of the low-frequency Fourier components which are associated with an object so that a reconstruction of the object can be made. The estimation of the phase and the amplitude is an inverse problem that does not have a unique solution. There are a number of possible methods of solving this inverse problem. One method is outlined in more detail below.

The principle used is the following.
1. Assume that the Fourier components whose spatial frequency is greater than some specified critical frequency are associated with objects below a corresponding critical size,
2. bus that those objects have unknown Fourier components at frequencies less than the critical frequency, except that the sum of all the Fourier components must equal the input data, and
3. attempt to estimate the amplitudes and phases of those unknown components within the above constraint.
4. Low-frequency Fourier components which cannot be associated with high-frequency components must belong to larger-sized objects in the image. The objects which are reconstructed from the high-frequency components, together with their estimated low-frequency components. comprise both small scale-size objects and any "sharp" features, such as sharp edges, which should be associated with a larger object.

The objects reconstructed in this way turn out to be extremely faithful reproductions both of rest input data and of the human visual perception of objects within cluttered images.

The fact of breaking-up of sharp edges into discrete objects is usually not a problem in most images where such sharp edges are not common. This fact is shared by the prior art (previously-discussed) wavelet and spatially-non-linear analyses.

Estimating the unknown components is an inverse problem which can be solved by maximising a mathematical function which combines a requirement for the reconstructed data to match the input signal and for the reconstructed data to minimise some cost function (equivalently known as a regularisation constraint). Examples of such inverse methods are given by Press W H. Teukolsky S A. Vatterling, W T & Flannery, B P. 1992. "Numerical Recipes in C". 2nd edition, Cambridge University Press.

The particular regularisation constraint which we adopt is to minimise the image cross-entropy relative to some prior model (Shore J E & Johnson R W, 1980, IEEE Transactions on Information Theory. 26, 26–37. and Johnson R W & Shore J E. 1983, IEEE Transactions on Information Theory. 29, 942–943). Minimising the cross-entropy has the advantages that (a) it is non-linear, which is needed in order to reconstruct the unknown Fourier components, and (b) it enforces the reconstructed objects to be positive (if the prior model is positive): thus object positivity is enforced (which is often physically correct) without placing any constraints at all on object shape or on the intensity profile of an object (unlike wavelet analysis).

In general we will be interested in objects within a cluttered image over a range of scale-sizes, and hence the description below incorporates a multiscale/multiresolution method. If desired, a single scale-size only could be analysed, however, Implementation of the New Method
1. Obtain a digital image, and arrange is for this to be input to a computer hardware and software system.
2. Using the computer system, carry out any appropriate normalisation or scaling of the intensity values which may (optionally) be required. In the case of radiological images, the measured quantity is related to the integrated X-ray absorption along the line-of-sight. Thus the brightness on a radiographic film is non-linearly related to the depth of an object at that location; in general one should apply a calibration relation to the measured intensity values in order to convert them to a measure of the optical depth at each location in the image. Taking the logarithm of the brightness values is often a good approximation to this calibration process.
3. Reduce all the pixel intensity values by a constant so that any background level on the image has a value of zero; this helps to suppress residual spurious structures in and near to the background region.
4. Carry out the cross-entropy minimisation, which is an iterative process. Any one of the methods for maximum entropy maximisation or cross-entropy minimisation could be employed in this application. The one we have chosen to implement is based upon the method of Cornwell T J & Evans K F, 1985, Astronomy & Astrophysics, 143, 77–83.

The following steps are implemented:
4.1 Create in computer memory an image which corresponds to a prior model, whose value is everywhere small (about 0.1 percent of the input image) and which nowhere either exceeds the signal in the input data or falls below a signal level of zero.
4.2 Create in the computer memory a "trial image", which initially is the same as the prior model.
4.3 Specify a Fourier critical frequency which corresponds to the scale size of interest. Often, a choice where the Fourier critical wavelength is equal to the diameter of the objects to be reconstructed turns out to be a useful choice.
4.4 Use a Fast Fourier Transform algorithm (e.g. Press W H. Teukolsky S A, Vetrerling, W T & Flannery, B P, 1992.

"Numerical Recipes in C", 2nd edition, Cambridge University Press) to high-pass filter this data, setting all Fourier amplitudes below the critical frequency to zero. Use the same algorithm to high-pass filter the trial image. Take the difference between these two outputs in the computer memory. Alternatively, the input and trial images may be differenced first and then high-pass filtered.

4.5 For each pixel in the trial image, calculate an improved estimate of the pixel value according to the prescription of Cornwell T J & Evans K F, 1985. Astronomy & Astrophysics, 143, 77–83. The calculation of the improved value has two competing terms: a term which attempts to force the high-pass filtered final trial image to have the same pixel values as the original image when that is high pass-filtered with the same filter; and a term which attempts to force minimisation of the cross-entropy of the final trial image with respect to the prior image model. The two components are combined by means of a Lagrange multiplier, which is a variable which may be set in computer memory at each iteration. Further details of this method are given below.

4.6 Cause the computer to iterate the steps 4.4 and 4.5 until a stopping criterion is reached. Normally the stopping criterion is based upon a measure of the residual signal in the high-pass difference image. At each iteration step the value of the Lagrange multiplier is modified to achieve a compromise between small residuals in the high-pass difference image, a low value for the final cross-entropy; and a finite computation time. A number of schemes can be employed to achieve this, the best choice will depend on the details of the application (but not on the details of individual images within that application). The prior model in use may also be updated periodically during the iteration process as the evidence for the presence of statistically-significant objects increases.

4.7 At the end of the iteration cycle, the final trial image contains a reconstruction of the small-size objects in the input image. It may be output to a computer file system, or directly to a visual display medium, or passed to a further computer system for subsequent analysis. The difference between this image and the input image contains reconstruction of large scale-size objects; this image may also be dealt with in the same manner.

4.8 Since the image containing large scale-size objects does not contain significant high frequency components, it may be sampled at a lower resolution. That lower resolution image may than itself be passed back into the minimum cross-entropy algorithm at step 4.1 in order to create a multiscale/multiresolution analysis.

5. Each of the multiscale/multiresolution output images may then be analysed as appropriate for the application. In the case of detecting malignant opacities on radiological images, for example, discrete objects may be detected within one of the images, its properties analysed, such as for example its shape or its texture or its relationship to other physiological structures, and a decision taken about the likelihood of that object being of clinical interest. The decision may be taken by a human observer (such as a radiologist viewing a computer screen or other form of displayed output) or the decision may be made by an additional computer system.

The following are further details of the calculation of an improved estimate of the pixel value for each pixel in the trial image according to the prescription of Cornwell T J & Evans K F, 1985, Astronomy & Astrophysics, 143, 77–83. This point has been referred to above under point 4.5.

For each pixel in the trial image, an improved pixel value is calculated which is a balance between the requirements that the final trial image should contain the same high-frequency components as the original input image and the requirement that the cross-entropy of the trial image should be minimised (or alternatively that the entropy of the trial image should be maximised).

The pixel value chosen at each step is an approximate solution to the equation $$\nabla S + \lambda \nabla \chi^2 = 0$$

where S is the image entropy $$S = -\sum_j p_j \log p_j$$

or image cross-entropy for a set of pixel values $p_j$ and a set of values of a prior model $$S = \sum_j p_j \log(p_j / m_j)$$

$m_j$, and $\chi^2$ is a measure of agreement between the high-frequency components of the original image and of the trial image at any step:

$$\chi^2 = \sum_j (\Delta_j^F)^2$$

where $$\Delta_j^F$$

is the difference in those high-frequency components for the $j^{th}$ pixel and where in all cases the summations are over all the pixels n an image. $\lambda$ is a Lagrange undetermined multiplier which may be treated as a variable parameter in the cycle of iterations and which can be used to control both the speed and accuracy of the convergence towards the solution.

The equation does not have an exact solution, and hence there are a number of different methods in the literature for solving it: the method used in the present embodiment is based upon the suggestion of Cornwell & Evans, which in the present problem results in calculating the following correction $X_j$ to each of the j pixel values:

$$X_j = \frac{(\Delta_j^F + \lambda \log(p_j / m_j))}{(1 + \lambda / p_j)}$$

with the additional constraint that no pixel value $p_j$ should be less than zero after application of the correction vector.

In the process of automatically identifying malignant masses in a mammogram there are the following four stages:
1. The method described above, which method is based on Maximum entropy processing or cross-entropy minimisation.
2. The detection of candidate malignant opacities.
3. The classification of these opacities as either normal or malignant.
4. The generation of output information for those masses that are classified as malignant, to be used as a prompt by the radiologist.

Stage 1 can be used in isolation if a radiologist simply wants to view the images. However, if one wants to automatically detect and classify abnormalities, steps 2 and 3 need to be elaborated, An example of such a method for automatically carrying out steps 2 and 3 is described below.

The detection process works as follows.
1. At one of the scale-sizes, the image containing the small objects is loaded into the computer memory,
2. Pixels in the image are ordered by intensity value, brightest first.
3. Candidate opacities are identified by working through the list of ordered pixels one at a time. If a pixel has no other pixels touching it with a higher intensity value, then that pixel is identified as the first in a new region. If a pixel is not isolated, but instead is found to be touching an existing region (i.e. there is one or more adjacent pixel whose intensity is greater than that of the current pixel), then a new region is not created, but instead the pixel is added to the existing region. If a pixel touches two different existing regions, then those two regions are merged into one, subject to a stopping criterion described below. Each region is grown until one of three stopping criteria is reached: (a) the addition of a new pixel causes two or more regions to merge which are already larger than a specified size; or (b) the addition of a new pixel causes the average brightness of the pixels in the region to decrease, where the brightness of each pixel is measured above the current value of pixel intensity; or (c) the intensity of a pixel is as low as a specified limit. Invoking criteria (a) or (b) causes an individual region to stop growing. Invoking condition (c) causes all regions to stop growing and this part of the process terminates. At the end of this process, regions are rejected if they are either (a) smaller than a specified minimum size or (b) larger than a specified maximum size or (c) found at a location on the image which is not within the interesting breast area. The remaining regions are then treated as identifying the pixels in the image which correspond to a candidate opacity. At this stage the great majority of the candidate opacities do correspond to real structures within the breast, but most of them are normal glandular structures. A further classification stage (3) is necessary to classify each one as being most likely to be either malignant or normal.

More than one scale-size may be used independently in order to achieve sensitive detection for all sizes of malignant opacity. The useful range over which the method works covers radiological sizes of 6 mm to 3 cm. The small sizes may be the most important to radiologists as the patient's prognosis is greatly improved if the cancer can be detected early, when it is small, and before it has significantly invaded other tissue.

The classification stage is essential in order to alert radiologists to the presence of potential malignant opacities without a large number of normal structures being identified.

Classification methods have been used before to identify malignant opacities in breast images (e.g. Wei et al Med Phys. 22, September 1995, pages 1501–1512).

With regard to classification the following two issues are important; (1) what information should be given to a classification scheme: and (2) what method of classification should be used.

Almost any discriminant method could be applied here, including neural networks.

In this embodiment a method has been used which parametrises the statistical distributions of malignant and normal structures within a parameter space of nine dimensions.

The information given to a classification scheme is the following:
1. Size of candidate opacity.
2. Length of major-axis of an ellipse fitted to the pixel data for this opacity.
3. Length of minor axis of that ellipse.
4. Total brightness of all the pixels in the opacity, measured above the brightness threshold at which that region stopped growing in the detection stage.
5. The local background level around the opacity.
6. The total brightness within the area occupied by the identified opacity in other images: in particular, in the original image, and in other maximum entropy images containing smaller and larger objects,
7. Distance of each opacity from the nearest other identified opacity.

Hence the current classification scheme uses information about the shape of an opacity and the texture of an opacity (from the multi-scale data) and some (incomplete) information about the degree of isolation of an opacity. Other measures of shape, texture and isolation could be incorporated, especially texture measures which are sensitive to radiating patterns such as found in stellate lesions. Further information could also be included such as information about the overall statistical properties of a breast, more detailed positional information about the location of an opacity, and information from other mammograms such as previous screenings, from which the growth of an opacity could be identified.

In a specific embodiment the original image is a medical image such as a radiographic image (e.g. a mammogram) stored in a photostimulable phosphor screen.

The digital signal representation is obtained by scanning the exposed screen with stimulating irradiation such as light of a wavelength adapted to the photostimtulable phosphor that is used.

Upon stimulation the phosphor emits light which is then detected by a detection system such as a photomultiplier that converts the emitted light into an electric signal. The electric signal is then amplified and digitized.

What is claimed is:
1. A method for automatically detecting objects within an original image, said objects having a size which is smaller than a predefined maximum size comprising the steps of:
acquiring a digital signal representation of said original image,
applying said digital signal representation to a computer to subject it to a process which results in a new image which contains only reconstructions of said objects, said process comprising the steps of:
(i) generating Fourier components of said original image by applying the Fourier transform;
(ii) defining a critical Fourier wavelength equal to the maximum size; and
(iii) applying one of the techniques of entropy maximisation and cross-entropy minimisation to said original image to create said new image wherein (a) the amplitudes and the phases of the Fourier components of said new image with wavelengths that are shorter than said critical Fourier wavelength are substantially the same as the amplitudes and the phases of the Fourier components of said original image, and wherein (b) for the amplitudes and the phases of Fourier components having wavelengths that are longer than said critical wavelength, new values are estimated so that either image cross-entropy is minimised or image entropy is maximised.

2. A method according to claim 1 wherein a second new image is created from the difference of said original image and the new image, and wherein said second new image is subjected to steps (i) to (iii), wherein it replaces the original image.

3. A method according to claim 1 applied to a number of object sizes.

4. A method according to claim 1 wherein said cross-entropy minimization or entropy maximisation comprises the steps of:
(a) creating a 'prior model image' the pixel values of which are small compared to the pixel values of said original image and greater or equal than a signal value of zero, and storing said prior model image into the memory of said computer;
(b) creating a 'trial image' that is equal to said prior model image and storing it into said memory;
(c) specifying a Fourier critical wavelength indicative of said scale-size of said objects;
(d) applying a high-pass filter to said original image by means of a Fast Fourier Transform to generate a 'High-pass Filtered original image', whereby the amplitudes of all Fourier components whose wavelengths are longer than said critical wavelength are set to zero, and storing said 'High-pass Filtered original image' in computer memory;
(e) applying the same high-pass filter to said trial image to generate a 'High-pass filtered trial image' in computer memory;
(f) calculating the difference between corresponding pixel values of the 'High-pass filtered trial image' and the 'High-pass filtered original image' to create a 'High-Pass filtered difference image' in computer memory;
(g) calculating for each pixel of the trial image an improved pixel value that is obtained by balancing the requirement that the trial image should comprise the same Fourier components with a wavelength shorter than said critical wavelength as the original image, as measured by said 'High-pass filtered difference image', and that the cross-entropy of the trial image with respect to said prior model image is minimized or the entropy of the trial image is maximized;
(h) causing the computer to reiterate steps (f) and (g) until a stopping criterion is reached; and
(i) outputting the final trial image obtained at the end of iteration cycle (h).

5. A method according to claim 1 wherein said cross-entropy minimization or entropy maximisation comprises the steps of:
(a) creating a 'prior model image' the pixel values of which are small compared to the pixel values of said original image and greater or equal than a signal value of zero, and storing said prior model image into the memory of said computer;
(b) creating a 'trial image' that is equal to said prior model image and storing it into said memory;
(c) specifying a Fourier critical wavelength indicative of said scale-size of said objects;
(d) calculating the difference between pixel values of said original image and said trial image to generate a difference image, and storing it in computer memory;
(e) applying a high-pass filter to said difference image by means of a Fast Fourier Transform to generate a 'High-pass filtered difference image' whereby the amplitudes of all Fourier components whose wavelengths are longer than said critical wavelength are set to zero, and storing said 'High-pass filtered difference image' in computer memory;
(f) calculating for each pixel of the trial image an improved pixel value that is obtained by balancing the requirement that the trial image should comprise the same Fourier components with a wavelength shorter than said critical wavelength as the original image, as measured by said 'High-pass filtered difference image', and that the cross-entropy of the trial image with respect to said prior model image is minimized or the entropy of the trial image is maximized;
(g) cause the computer to reiterate steps (e) and (f) until a stopping criterion is reached; and
(h) output the final trial image obtained at the end of iteration cycle (g).

6. A method according to claim 4 wherein the final trial image is passed to a further computer system for subsequent analysis.

7. A method according to claim 5 wherein the final trial image is passed to a further computer system for subsequent analysis.

8. A method according to claim 1 wherein said image is normalized or scaled before being subjected to cross-entropy minimization or to maximum entropy maximization.

9. A method according to claim 4 wherein a pixel value of said prior model image is equal to about 0.1% of a corresponding pixel value of said original image.

10. A method according to claim 5 wherein a pixel value of said prior model image is equal to about 0.1% of a corresponding pixel value of said original image.

11. A method according to claim 1 wherein said scale-size of interest corresponds to a Fourier critical wavelength that is equal to the diameter of objects to be detected.

12. A method according to claim 1 wherein said image is a mammogram and wherein said objects are opacities in said image.

13. A method according to claim 1 wherein said image has been stored in a photostimulable phosphor screen and wherein said digital image representation is obtained by scanning said screen with stimulating radiation, detecting light emitted upon stimulation and converting detected light into a digital signal representation.

* * * * *